US011543514B2

(12) United States Patent
Vonderahe et al.

(10) Patent No.: US 11,543,514 B2
(45) Date of Patent: Jan. 3, 2023

(54) ACTIVITY DETECTION IN SAND ENVIRONMENT

(71) Applicant: Element Hope, Inc., Rochester, NY (US)

(72) Inventors: Roger P. Vonderahe, Rochester, NY (US); Patricia L. Vonderahe, Rochester, NY (US); Michael W. Schab, Rochester, NY (US); Ryan M. Bowen, Mendon, NY (US)

(73) Assignee: Elemenf Hope, Inc., Rochester, NY (US)

( * ) Notice: Subject to any disclaimer, the term of this patent is extended or adjusted under 35 U.S.C. 154(b) by 446 days.

(21) Appl. No.: 16/832,944

(22) Filed: Mar. 27, 2020

(65) Prior Publication Data

US 2020/0309943 A1    Oct. 1, 2020

Related U.S. Application Data

(60) Provisional application No. 62/826,762, filed on Mar. 29, 2019.

(51) Int. Cl.
*G01S 13/88* (2006.01)
*G01S 13/02* (2006.01)
*G01S 13/62* (2006.01)

(52) U.S. Cl.
CPC ........ *G01S 13/885* (2013.01); *G01S 13/0209* (2013.01); *G01S 13/62* (2013.01)

(58) Field of Classification Search
CPC .... G01S 13/885; G01S 13/0209; G01S 13/88; G01S 13/34; G01S 13/62; G01S 7/411; G01V 11/00; G01V 8/00; G01V 8/26; G01V 3/12; G01V 3/16
USPC .......................................................... 342/22
See application file for complete search history.

(56) References Cited

U.S. PATENT DOCUMENTS 5,400,030 A * 3/1995 Duren ...................... G01V 3/12
                                                        342/22
5,835,054 A * 11/1998 Warhus ................. G01S 13/867
                                                        342/197
6,806,821 B2 * 10/2004 McLemore ........... G01S 13/888
                                                        342/195

(Continued)

FOREIGN PATENT DOCUMENTS

CA        2605339       10/1994

OTHER PUBLICATIONS

Ermakov et al., Mining Sea Turtle Nests—An Amplitude Independent Feature Extraction Method for GPR Data, 2012 14th International Conference on Ground Penetrating Radar (GPR) Jun. 4-8, 2012, Shanghai, China @ ISBN 978-1-4673-2663-6.

(Continued)

*Primary Examiner* — Olumide Ajibade Akonai
(74) *Attorney, Agent, or Firm* — Tracy Jong Law Firm; Tracy P. Jong; Cheng Ning Jong (57) ABSTRACT

A method for detecting an activity of an object disposed within a medium at a depth ranging from about 0 to about 100 cm using a radar system, the method including establishing a baseline radar power level of the object in the medium; and detecting one or more radar data anomalies in radar data received of the medium with respect to the baseline radar power level, wherein a presence of the one or more anomalies indicates a presence of the activity of the object.

6 Claims, 10 Drawing Sheets

(56) References Cited

U.S. PATENT DOCUMENTS 8,849,054 B2 * 9/2014 Liu ................... H04N 5/145
                                        348/208.99
2018/0217231 A1 * 8/2018 Stanley ............. G01S 13/951

OTHER PUBLICATIONS

Korczak et al., Using Ground Penetrating Radar (GPR) to Identify Turtle Nests, Resilient Infrastructure, Jun. 1-4, 2016.

* cited by examiner

ACTIVITY DETECTION IN SAND ENVIRONMENT

PRIORITY CLAIM AND RELATED APPLICATIONS

This non-provisional application claims the benefit of priority from provisional application U.S. Ser. No. 62/826,762 filed on Mar. 29, 2019. Said application is incorporated by reference in its entirety.

BACKGROUND OF THE INVENTION

1. The Field of the Invention

The present invention relates to a surface/subsurface activity detection system and method. More specifically, the present invention is directed to a turtle hatching detection system and method.

2. Background Art

Many species of sea and freshwater turtles and tortoises inhabiting waters around the world are considered threatened or endangered. Turtles nest in areas with sand, gravel or other loose substrates. Efforts have been made in various locales in the United States and other countries to monitor and increase the chance of success of turtle hatchlings in the wild. In some instances, freshly laid turtle eggs are recovered and reburied in controlled and managed areas where the hatching of the turtle eggs is closely supervised over long periods of time to ensure that hatchlings are aided in their return to the oceans. However, this effort is largely impractical and costly when such supervision is not available. Various papers also describe the work done in identifying the locations of turtle nests in efforts to monitor and protect the nests before the eggs in the nests hatch. According to the article "Mining Sea Turtle Nests" by Ermakov et al. (hereinafter Ermakov), nest success is influenced by many factors: temperature, natural disasters, predation and poaching. According to the article "Using Ground Penetrating Radar (GPR) to Identify Turtle Nests" by Korczak et al. (hereinafter Korczak), turtle nests are essentially void spaces in the subsurface and can be detected using GPR because of the change in the reflected radar signal velocity. In order to monitor a nest, it must first be located. It is impossible to locate all the nests while the females are laying their eggs. Ermakov discloses a technique for locating nests with a ground penetrating radar (GPR) which can be an improvement over the conventional technique where an observer examines the sand for clues that indicate whether a sea turtle has nested. While a GPR has been used to locate a turtle nest for the subsequent monitoring of it, there are currently no tools or techniques useful for detecting the hatching of eggs such that personnel may be deployed to ensure hatchlings can navigate safely to the surf zone. Hatchlings may be observed via an imaging technique, e.g., with cameras, to emerge from the depth of a nest. However, when this occurs, it may be too late for personnel to get to the nest to protect the hatchlings from predators, e.g., wild turkeys, ravens and crows, raccoons, wolves, red foxes and sea gulls, etc. Protective nest cagings or exclusion fencings disposed on the surfaces of nests may be used to prevent access of predators to the nests during incubation or keep emerging hatchlings in a confined area and away from predators after the hatchlings have emerged to the surface. However, without an automated hatching indicator, there can still be delays for personnel to arrive at the nest to facilitate escape of hatchlings to the surf zone as the very cagings used to protect the hatchlings can also serve as death traps if the hatchlings cannot move out of them to reach the shore. Therefore, it is critical to the survival of the hatchlings to be able to be aided by dedicated personnel as soon as they are hatched.

Automated motion or activity detection of an object or human above ground has been attempted. However, non-intrusive subsurface activity detection has not been successfully attempted until now. Ermakov's claim of "The idea of applying these sensors for detecting biological materials is fairly novel. In particular, returns obtained in wet salty sand, which is known to be a difficult medium in itself, often do not provide substantially distinct signatures for turtle eggs given the similarity of their electromagnetic properties when compared to background" regarding using GPRs for detecting biological materials, e.g., turtle eggs demonstrates that it would not have been obvious for one skilled in the art to use GPRs for the purposes of locating turtle nests due to the disclosed challenges, let alone detecting hatching eggs using the same sensors due to the technological challenges identified. Neither Ermakov nor Korczak discloses using an ultra-wideband impulse radar (UWB-IR) and machine learning for the purpose of creating baseline activity power levels. Ermakov discloses fine tuning the accuracy of detections of turtle nests by machine learning. Further, detection dogs have been used for finding nests after they become trained on oviductal fluid.

Canadian Pat. No. 2605339 to McEwan (hereinafter McEwan) discloses a motion sensor based on ultra-wideband (UWB) radar. UWB radar range is determined by a pulse-echo interval. For motion detection, the sensors operate by starting at a fixed ranged and then sensing any change in the averaged radar reflectivity at that range. A sampling gate is opened at a fixed delay after the emission of a transmit pulse. The resultant sampling gate output is averaged over repeated pulses. Changes in the averaged sampling gate output represent changes in the radar reflectivity at a particular range, and thus motion. McEwan fails to disclose an in-the-ground or subsurface application and an application that is aided with a machine learning technique, e.g., in creating baseline activity power levels.

There exists a need for a non-intrusive detector and method capable of detecting hatching turtle eggs in a turtle nest in their natural habitat.

SUMMARY OF THE INVENTION

In accordance with the present invention, there is provided a method for detecting an activity in a turtle nest disposed within a medium using a radar system, the method including:
(a) establishing a baseline radar power level of the turtle nest in the medium; and
(b) detecting one or more radar data anomalies in radar data received of the medium with respect to the baseline radar power level, wherein a presence of the one or more anomalies indicates a presence of the activity in the turtle nest.

In one embodiment, the one or more anomalies includes a threshold value that is at least about 3 standard deviations of the mean power levels for the baseline radar power level. In one embodiment, the one or more anomalies includes an activity power over about −10 decibel (dB). In one embodiment, the establishing step includes establishing the baseline radar power level by using a training technique. In one embodiment, the radar system includes an ultra-wideband impulse radar (UWB-IR) system. In one embodiment, the establishing step includes disposing the radar system above the medium without disturbing the medium. In one embodiment, the medium is a medium is sand, dry sand or wet sand. In one embodiment, the method further includes comparing a level of the one or more radar data anomalies to an activity power threshold level for a predator of the turtle nest, wherein if the level of the one or more radar data anomalies is the same or larger than the activity power threshold level for the predator of the turtle nest and the activity power threshold level for the predator is higher than an activity power threshold level for a turtle nest, the presence of the activity in the turtle nest is deemed inconclusive.

An object of the present invention is to provide a non-intrusive detector and method capable of detecting a subsurface activity of a biological material, e.g., hatching turtle.

Another object of the present invention is to provide a reliable early warning of hatching turtles to a stakeholder.

Another object of the present invention is to provide a reliable early warning of hatching turtles to a stakeholder where the nest from which the hatching turtles will emerge has been left undisturbed or the nest has been left in its natural environment.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—activity detector
4—radar module
6—medium, e.g., sand environment
8—turtle egg
10—hatching turtle egg
12—just hatched turtle
14—depth of turtle nest
16—height of offset air box
18—communication between satellite and controller
20—communication between cell tower and controller
22—communication between satellite or cell tower and mobile device, e.g., cell phone
24—controller
26—cell tower
28—mobile device, e.g., cell phone
30—offset air box
32—line
34—line
36—opening
38—platform
40—leg
42—internet
44—satellite
46—Global Positioning System
48—event

PARTICULAR ADVANTAGES OF THE INVENTION

The present detector allows the detection of activities in turtle nests in sand environments. Ermakov discloses fine tuning of the accuracy of detections of turtle nests by machine learning. Korczak discloses a turtle nest location identification method and system that uses a ground penetrating radar (GPR) without specifying whether or not the GPR is a UWB-IR. However, neither Ermakov nor Korczak discloses a method or device useful for detecting activities in turtle nests or sand environments and providing early warning to a stakeholder.

In one embodiment, the accuracy of activity detections is improved by means of building a baseline model of the local environment in which the activity detections are to be made. Environments in which turtles lay their eggs can vary widely even within a locale due to variations in elevation, distance from the surf zone, moisture and salt content and porosity, etc., all of which can affect whether a pre-tuned GPR can effectively detect an activity in a subsurface sand environment.

The present detector provides an early warning indicating turtle eggs are hatching such that personnel may arrive on scene to aid hatching turtles to emerge successfully from their nest and head towards the ocean. Even if protective cagings are used, early arrival of personnel at the nest at the scene is still required to ensure that the hatchlings do not get stranded in the protective cagings which can severely deteriorate their health especially on warm days.

The present detector is non-invasive as a subsurface activity can be detected without exposing the subsurface, e.g., via digging, etc. Further, the present detector can be used to detect surface activities of potential intruders of turtle nests or turtles which have breached the surface of their nests. The present detector is suitable for detecting nests at depths up to about 100 cm deep. Even if turtle nests were to be dug up and relocated to an artificial incubator, much effort would have to be spent on digging up the nests and preserving the integrity of the eggs. No such efforts are required with the use of the present detector.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The term "stakeholder" is used herein to mean a turtle, wildlife or conservation researcher or worker, park ranger, conservationist, etc., or any personnel that otherwise takes an interest in the conservation, propagation and well-being of species of turtles in their natural habitats.

Figure 1:
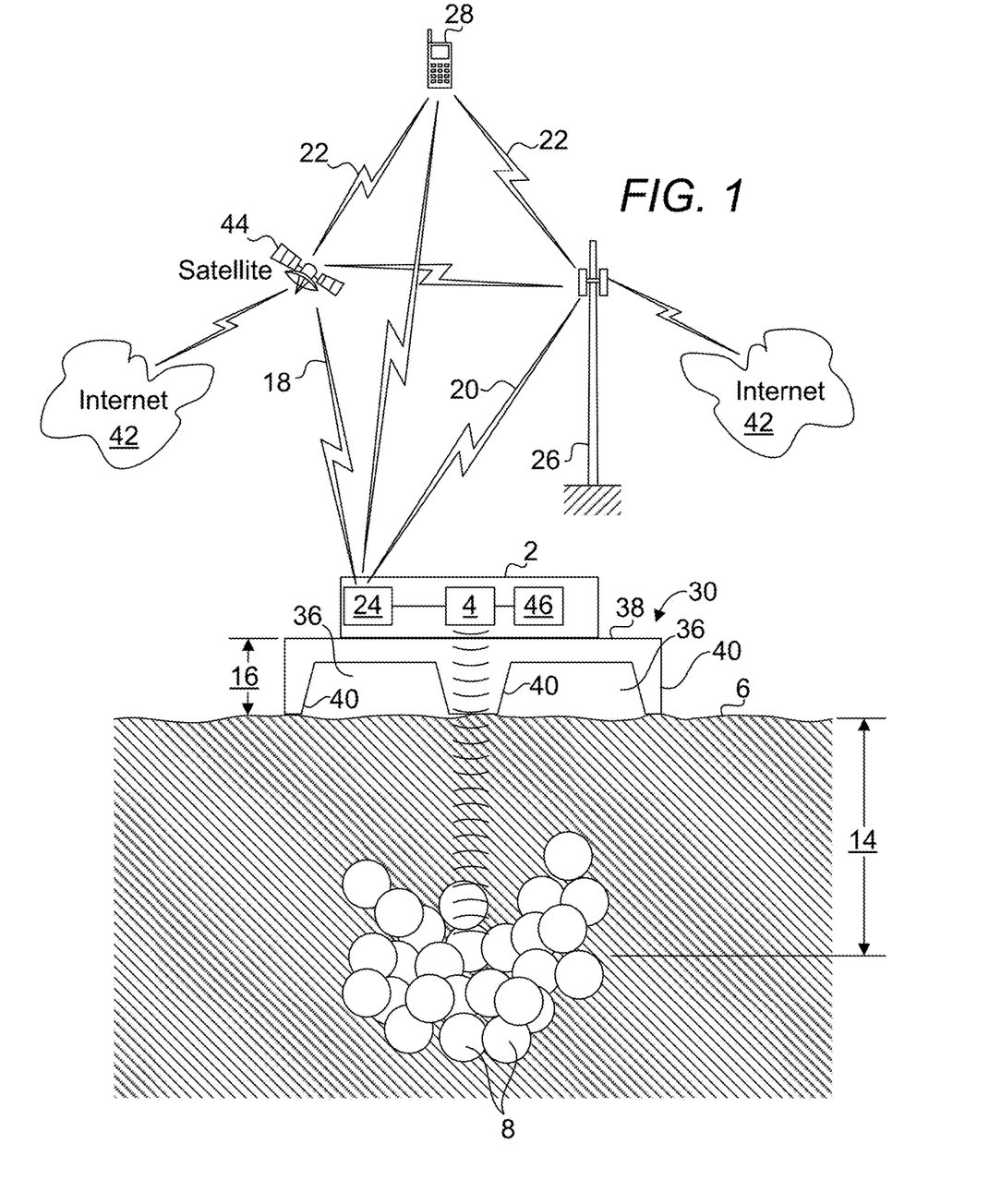
FIG. 1 is a diagram depicting a radar module useful for detecting the hatching of turtle eggs where no eggs have hatched yet.
Figure 2:
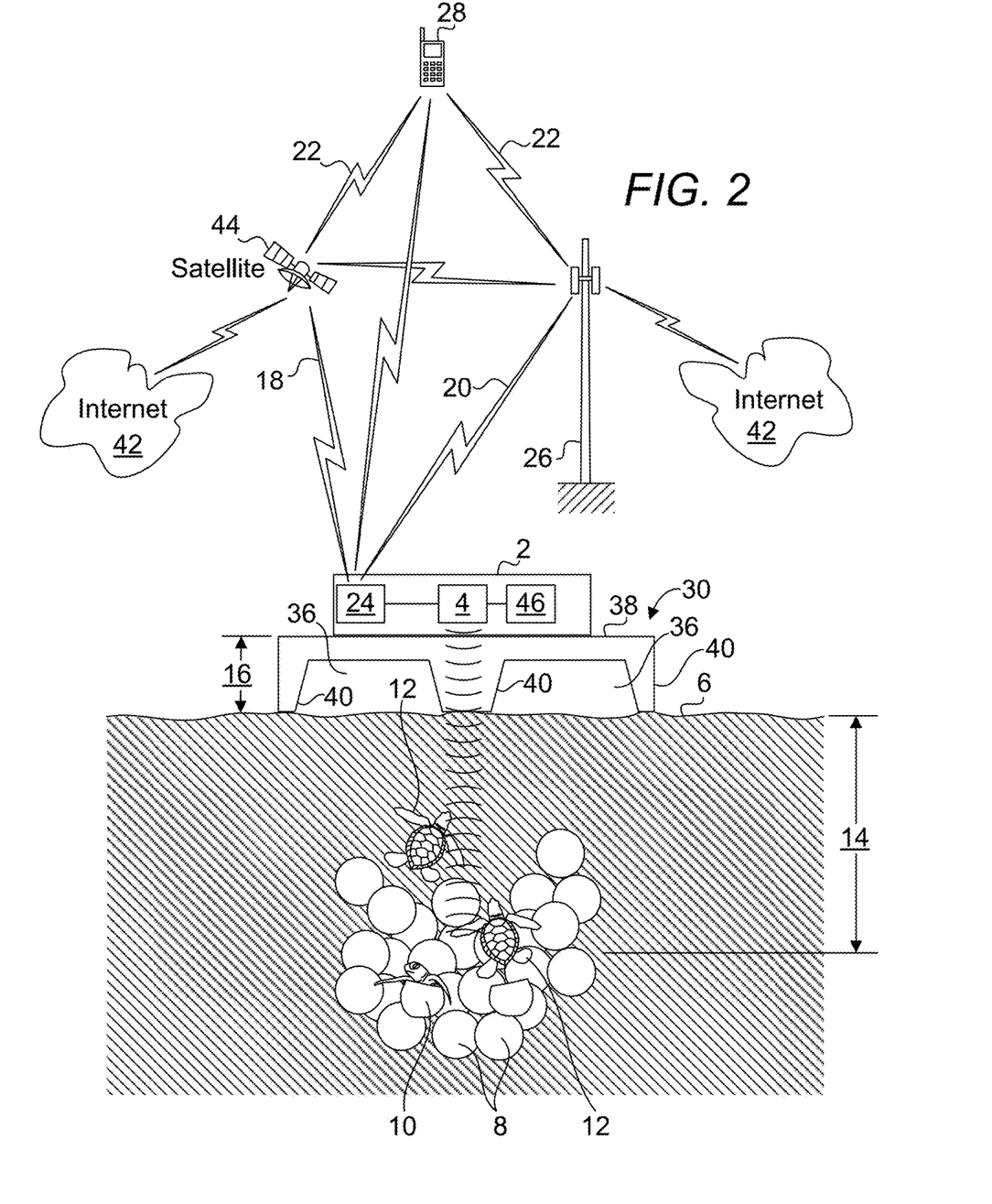
FIG. 2 is a diagram depicting a radar module useful for detecting the hatching of turtle eggs where some eggs are hatching or have hatched.

According to the article "Cues used by Predators to Detect Freshwater Turtle Nests may Persist Late into Incubation" by Riley et al. (hereinafter Riley), predator clues include smell of oviductal fluid (cloacal mucus) exuded by sea turtles during oviposition (laying) of eggs, and sound from hatchlings vocalizing within nest cavity after hatching. Predators may dig up nests based on these clues. Therefore, it is important to identify the time when hatching begins such that the hatchlings may be safeguarded to prevent predation. Even if predation has started, an early arrival of a stakeholder can result in remaining unharmed turtles from being saved. FIGS. 1-2 depict a setup useful for detecting hatching eggs in a turtle nest. FIGS. 3-9 depict charts showing radar power levels useful in establishing baseline radar power level for a specific environment and detecting anomalies corresponding to activities of the specific environment. FIGS. 3-9 depict time-series plots of calculated power (expressed in decibel or dB) of the non-static reflected radar signal. In each chart, an increase in power is directly related to activity within the turtle nest. In one embodiment, activity detection is a hard-limit placed at about −10 dB. Therefore, in one embodiment, periods of motion are reported as periods of time in which the calculated power level is greater than −10 dB. In another embodiment, periods of motion are reported as periods of time where the calculated activity power level over time meets a threshold value that is at least about 3 standard deviations of the mean power levels for the baseline radar power. In one example, a sea turtle nest is a sand environment disposed at a depth of about 23 cm from the top surface of the nest and the radius of the nest is about 30.5 cm. As turtle nests vary in depth, size, i.e., the number of eggs, etc., and the wetness of sand environment, a baseline model that represents a particular nest environment to be monitored shall be established prior to the monitoring of the nest.

Figure 2A:
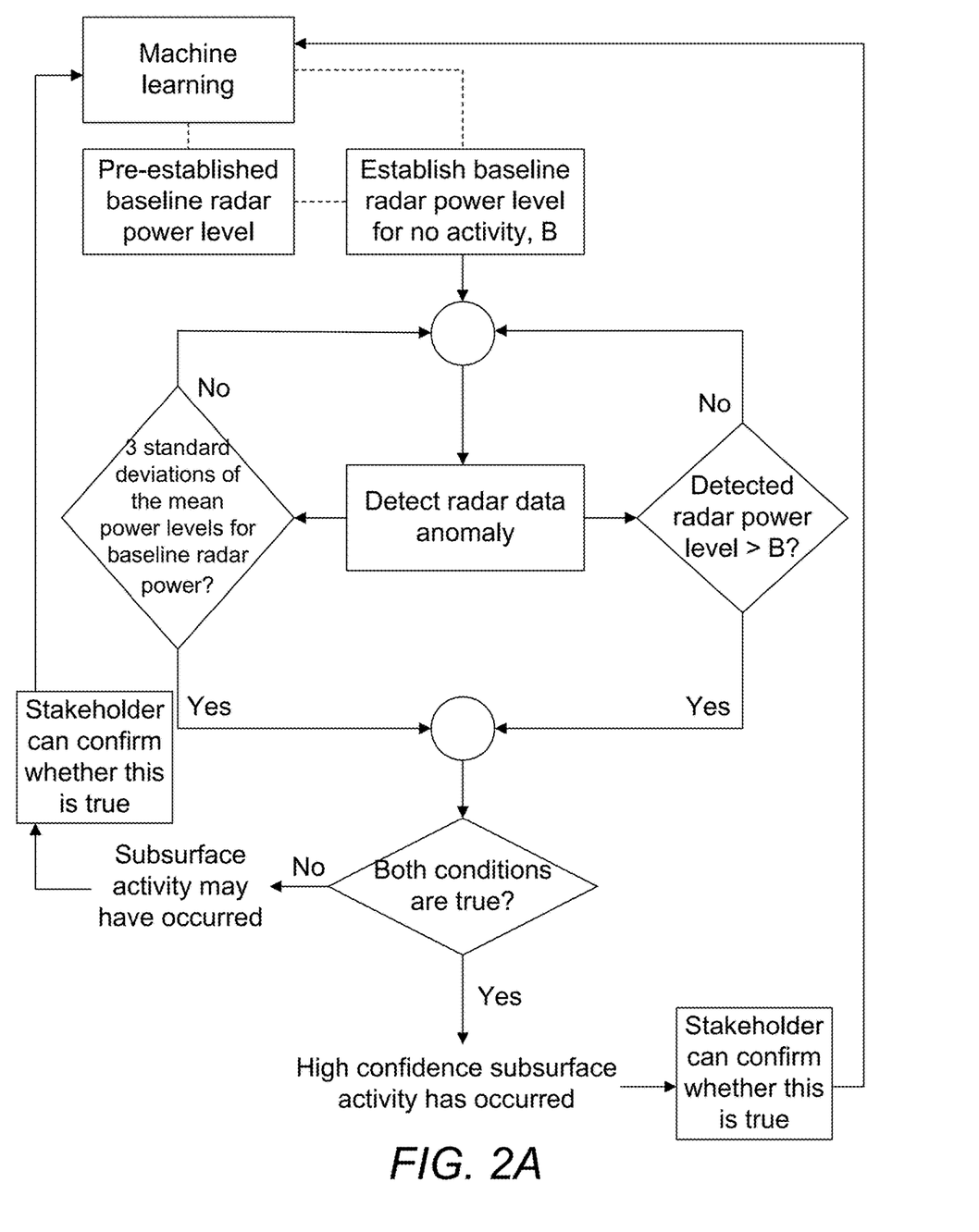
FIG. 2A is a diagram depicting a process by which a subsurface activity can be determined using the radar system shown in FIGS. 1 and 2.

FIG. 1 is a diagram depicting an ultra-wide band impact radar (UWB-IR) module or detector 2 useful for detecting the hatching of turtle eggs 8 where no eggs have hatched yet. FIG. 2 is a diagram depicting a UWB-IR module useful for detecting the hatching of turtle eggs 8 where some eggs are hatching as shown in part 10 or some have hatched into hatchlings 12. FIG. 2A is a diagram depicting a process by which a subsurface activity can be determined using the radar system shown in FIGS. 1 and 2. An offset air box 30 is disposed between the detector 2 and the medium, e.g., sand environment 6. The offset air box 30 is essentially a structure that elevates the detector 2 such that it can be used for detecting a subsurface activity while allowing hatched turtles to escape the nest through large openings of the structure. In one embodiment, the offset air box 30 includes a platform 38 supported on a plurality of legs 40 and the height 16 of the offset air box 30 is about 9 cm and the transmit/receive antenna of the detector 2 is directed toward the turtle nest. Alternatively, the detector 2 may be supported on another structure as long as the detector 2 does not impede the trajectories of hatchlings and negatively impact the incubation of the turtle eggs which the detector 2 is used to monitor. A turtle nest is typically buried at a depth 14 ranging from about 20 cm to about 100 cm. A dry sand condition as used herein is defined as a condition where the moisture content is 15% or less by weight in a sand environment.

Disclosed herein is a portable activity detector 2 for detecting subsurface activities in a sand environment 6 using a radar module 4 and reporting such activities to the world external to the detector 2 via a controller 24. A detector 2 is typically disposed at a location without access to grid power. Therefore, the detector 2 must have its own power, e.g., drawn from an energy storage, e.g., a battery or a generator, e.g., solar power generator, capable of replenishing the energy storage. In one embodiment, the detector 2 is configured to communicate with a device capable of alerting a stakeholder of the detection of the activities subsurface, e.g., a researcher, park ranger or another personnel otherwise responsible for the well-being of a turtle nest the detector 2 is configured to monitor once an activity has been detected indicating that turtle eggs 8 in the nest may be hatching. The controller 24 may communicate indirectly with a mobile device 28, e.g., a cell phone via a satellite with communication 18 and eventually with the mobile device 28 via communication 22 or with a cell tower 26 before communicating via communication 22 with the mobile device 28. The controller 24 may alternatively or additionally communicate indirectly with a mobile device 28 via a cell tower 26 with communication 20 and eventually with the mobile device 28 via communication 22 or with a satellite 44 before communication 22 with the mobile device 28. The controller 24 may further alternatively or additionally communicate directly with the mobile device 28, e.g., via Wireless Fidelity (WiFi) or Bluetooth protocols, etc. Communication between the cell tower 26 and the satellite is also possible. Further, communication with the internet 42 can occur via the satellite 44 or via the cell tower. It shall be noted that the setup that includes the detector 2 and the offset air box 30 does not alter the nest and therefore non-intrusive and the original sand environment 6 is maintained.

Figure 3:
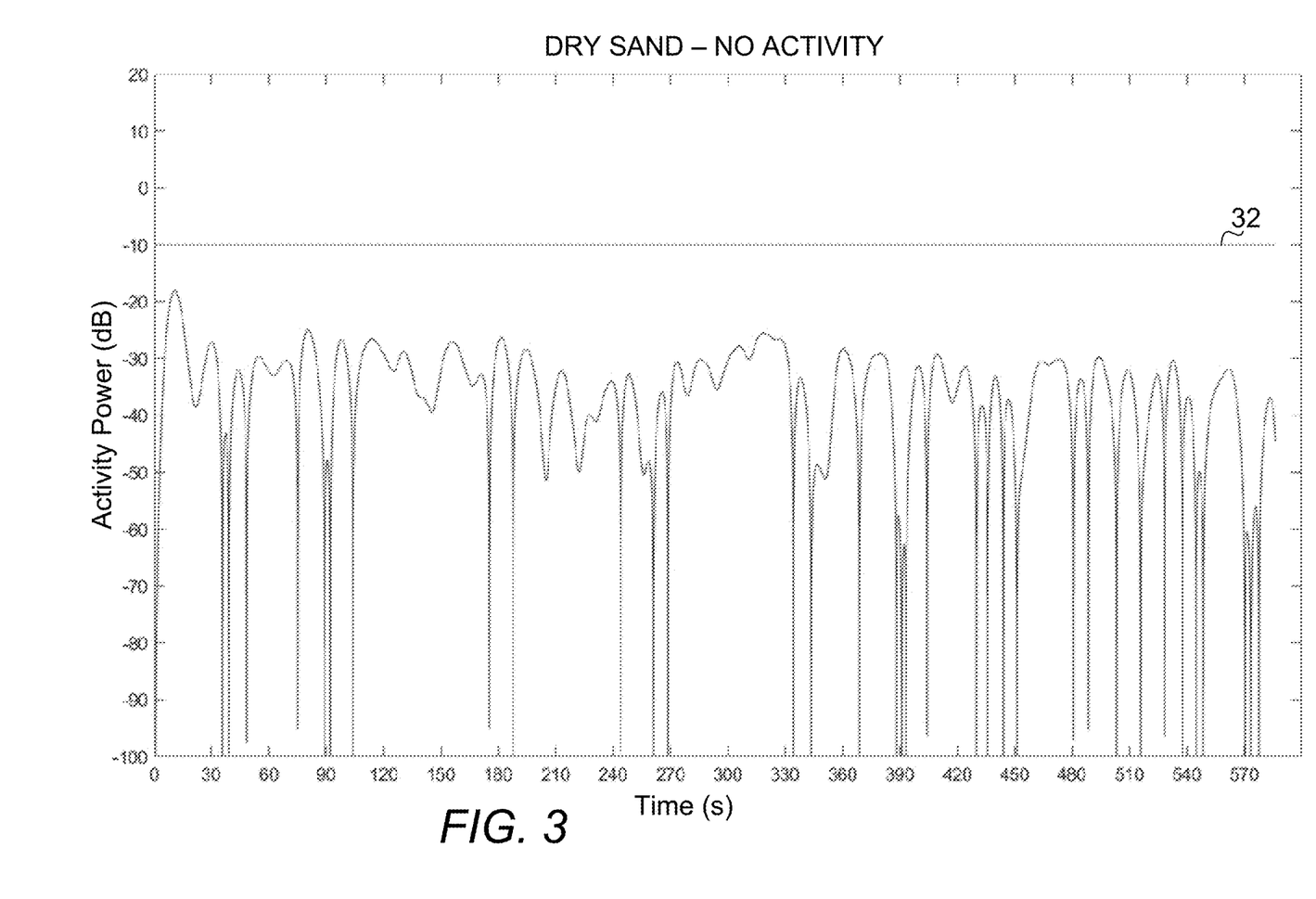
FIG. 3 is a diagram depicting exemplary radar power levels collected from a turtle nest without hatching activities in a dry sand environment.
Figure 5:
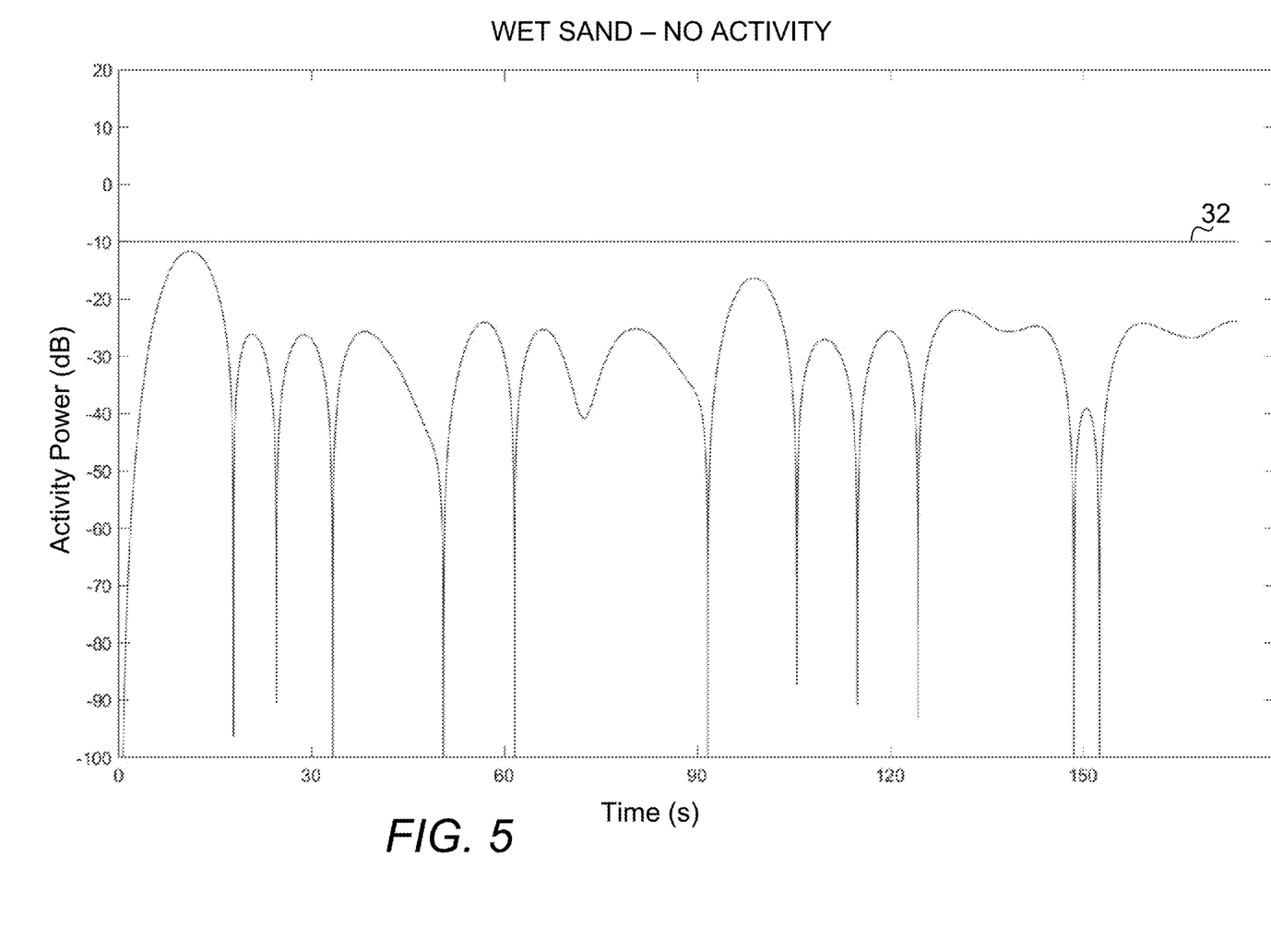
FIG. 5 is a diagram depicting exemplary radar power levels collected from a turtle nest without hatching activities in a wet sand environment.

FIG. 3 is a diagram depicting exemplary radar power levels collected from a turtle nest without hatching activities when the nest is dry. FIG. 5 is a diagram depicting exemplary radar power levels collected from the turtle nest of FIG. 3 without hatching activities when the nest is wet. A wet or saturated nest is defined as a nest having a humidity of at least about 100% and the sand/nest in such condition corresponds to the maximum absorption rate of radar signals. FIGS. 3 and 5, each shows a baseline of reflected UWB-IR signal for dry and wet sand, respectively. These baseline measurements are used to calibrate the signal processing methods used to extract/analyze activity. The accuracy of the present method to identity UWB-IR subsurface activity is dependent on the ability to segment dynamic and static clutter from the collected radar signal. Each radar frame collected is converted into feature vectors that may include the raw signal, complex baseband, statistical metrics, and/or other time/frequency-based features. These feature vectors are used to create model(s) that represents static and dynamic environmental noise. These model(s) are generated using unsupervised machine learning methods. The learned model(s) are then segmented from the raw signal(s) to increase signal/noise ratio and improve ability to detect true surface/subsurface activity. Machine learning is used to obtain one or more model(s) that are representative of a baseline for normal subsurface activity during the incubation period where there are no subsurface activities. The baseline activity model(s) are used to identify one or more novel surface/subsurface activity that may indicate one or more events including egg hatching, predators (both at surface and subsurface), extreme environmental changes, and any other novel activity suggesting further investigation and/or intervention. This stage of machine learning is designed to identity one or more events that may require further processing and not intended to specifically identify the exact type of activity observed. The model(s) used are generated using the calculated activity power for multiple time segments (training set). The model(s) are mathematically described using mixture models of the appropriate distribution (Gaussian, Poisson, Weibull, etc.). The estimation of the parameters to each model are determined using a combination of machine learning algorithms such as K-Means, Expectation Maximization, and other statically based model learning methods. Anomaly is identified as time-series radar features that deviate significantly from the learned baseline activity models. The amount of deviation (threshold) is determined using statistical metrics and/or user preference for detection sensitivity. Allowing statistical and/or user override of the threshold allows for control of the trade-off between false positive and false negative classification rates. Additionally, the present detector periodically updates its model(s) for baseline activity to adjust for gradual changes that may occur within the environment and/or the characteristic(s) of the radar system itself. Other machine learning methods are used to further classify detected novel surface/subsurface activity. Specific models are trained to represent specific novel activity such as egg hatching and/or predator invasions. These models are to be learned in a supervised process where an expert labels time-series data as specific activity observed during collections. The labeled datasets are to be used to train multi-class algorithms such as neural networks, extreme learning machines, and support vector machines. These multi-class algorithm(s) provide a likelihood (probability and/or distance-based metrics) that an event is a specific target activity such as egg hatching and/or predator invasion. The multi-class algorithm(s) are continually trained and re-deployed to the device(s) as newly observed and classified data is archived.

Referring to FIG. 3, without hatching activities, the detected power level is significantly below the activity detection line, i.e., line 32, and thus this dataset provides a suitable set for training a baseline of dry sand. It is important to note that the total duration of the data collection was about 10 minutes. This period of time may be adjusted to improve performance in another nest to yield a baseline that is representative of the nest. It shall be noted that there appears to be discernible radar power level differences between the dry and wet sand conditions, highlighting the need to calibrate the present detection scheme to local conditions if false detections were to be reduced or eliminated.

Figure 4:
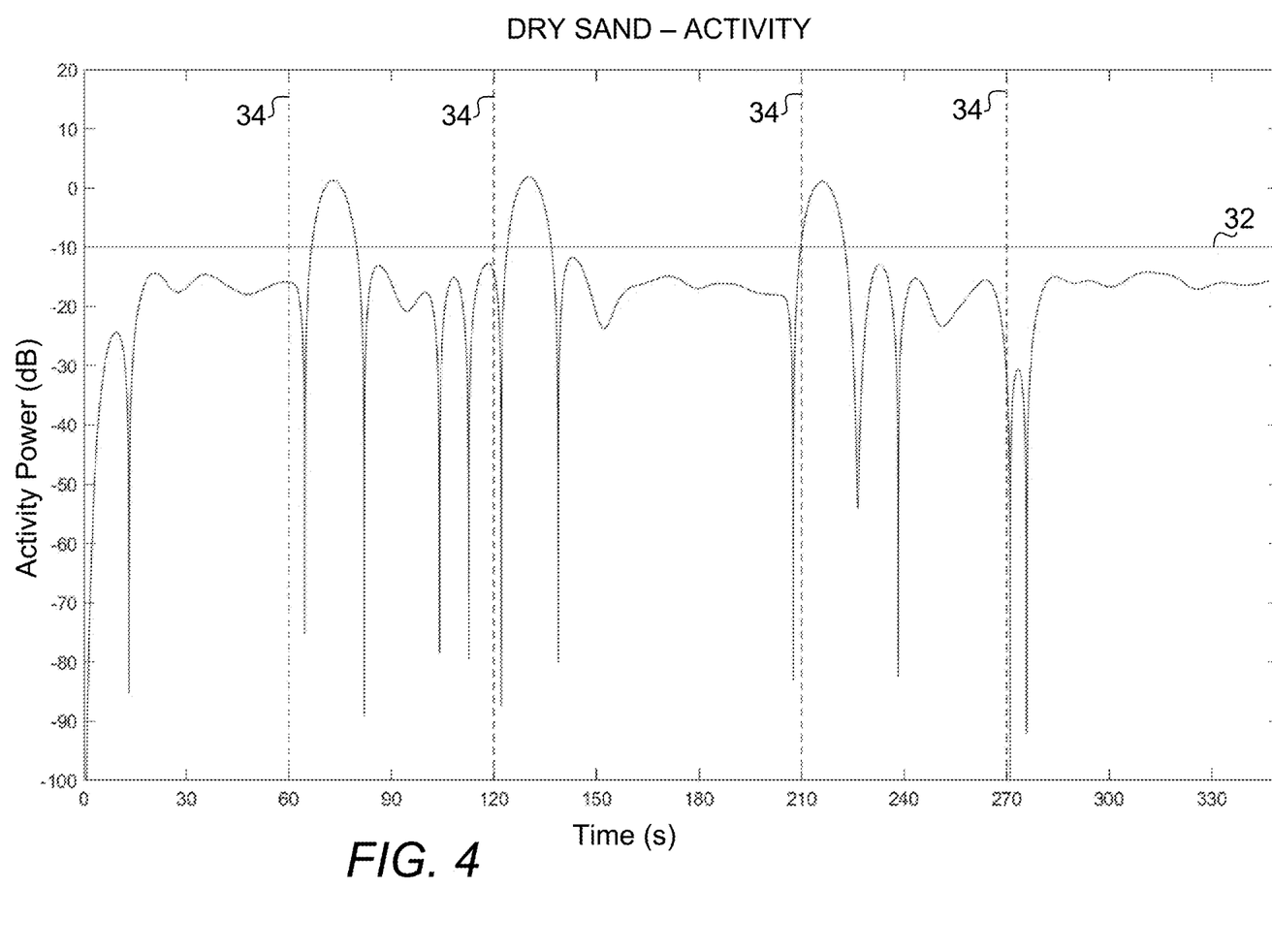
FIG. 4 is a diagram depicting exemplary radar power levels collected from a turtle nest with hatching activities in a dry sand environment.
Figure 6:
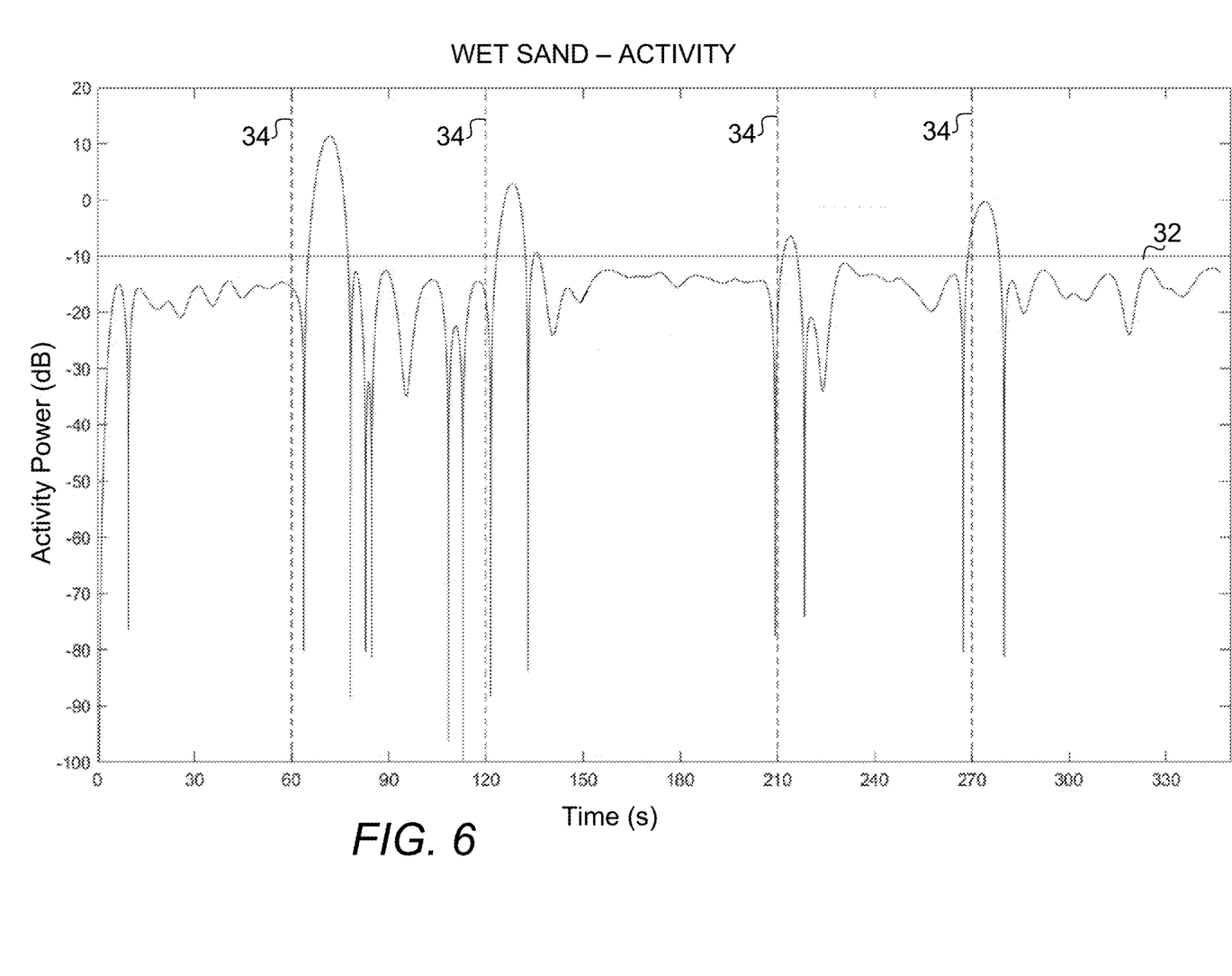
FIG. 6 is a diagram depicting exemplary radar power levels collected from a turtle nest with hatching activities in a wet sand environment.

FIG. 4 is a diagram depicting exemplary radar power levels collected from a turtle nest with hatching activities in the environment used to yield FIG. 3. FIG. 6 is a diagram depicting exemplary radar power levels collected from a turtle nest with hatching activities in the environment used to yield FIG. 5. Additional algorithmic tuning was performed to increase the performance of the activity detection. Baseline activity power thresholds are adjusted using collected training sets. Statistical metrics are used to adjust the baseline to improve the identification of surface/subsurface activity. Referring to FIGS. 3-6, line 32 indicates the threshold for activity detection which has been determined to be −10 dB and lines 34 each indicates the start of an activity, i.e., the point where the graph or detected activity power crosses (or rises above) the established threshold or line 32. Activity power can be quantified as the bandpower of target frequency ranges. The bandpower is calculated as the average power within specified frequency ranges. The activity power is estimated using power spectral density estimates. It can be summarized that, for a particular locale, an activity power level indicating hatching is first established for the particular species of turtles that nest in the locale. The frequency ranges are selected based on a dataset of frequencies observed from training sets containing hatching activities.

Referring back to FIG. 2A, by establishing a baseline activity power level indicating no subsurface activity at a locale and by examining the activity power level of turtle hatching (e.g., by examining one to several nests at the locale frequented by a particular species, e.g., Loggerhead, Leatherback or Green turtles, etc.), both false positives (non-turtle hatching activities that are falsely indicated as turtle hatching activities) and false negatives (actual turtle hatching activities that are not indicated as such) can be reduced. As nests of these species may differ in types of egg chambers formed by these different species of turtles, the baseline activity power level indicating no subsurface activity may differ sufficiently to affect the accuracy of detecting an activity. However, in situations where the baseline activity power level indicating no subsurface activity has not been established, the activity power threshold for activity detection shall be set at about −10 dB or the statistical threshold for activity power is set as periods of time where the calculated activity power level over time meets a threshold value that is at least about 3 standard deviations of the mean power levels for the baseline radar power. In one embodiment, a present algorithm responsible for raising a warning regarding the detection of a subsurface activity does not merely compare the activity power level to the baseline activity power level indicating no activity. With an activity detection that has been falsely raised, a stakeholder may respond by acknowledging that the activity detection has been falsely raised. By the same token, an activity that has failed to be detected can be marked by a stakeholder who examines the radar log of a nest as such. For instance, if a stakeholder has corroborating information regarding a failure to detect an activity, this failure can be marked on the radar log as a means to provide supervised or reinforcement machine learning to the present algorithm such that machine learning training can occur to fine tune the baseline activity power level and data variability threshold (e.g., expressed as standard deviation). If at least one of the conditions, i.e., a first condition where the radar power level is greater than the baseline radar power level indicating subsurface activity and a second condition where the at least 3 standard deviations of the mean power levels for the baseline radar power is met, then the possible subsurface activity is said to have occurred. However, if both conditions have been met, the likelihood that a subsurface activity has occurred is considered higher or the stakeholder can reasonably expect that a true turtle hatching event has occurred.

Further, by establishing a baseline activity power level indicating predator invasions, protection of a monitored nest can be further strengthened. It is not always easy to establish a base activity power of predator invasions. Therefore, it is acceptable to simulate such activities by disturbing the environment above the nest, e.g., by digging with a shovel or another digging tool for one or more nests. Various techniques can be employed to distinguish a hatching activity from a predation activity. Similar to the manner in which a hatching activity power level is established, a predation activity power level can be established to determine whether a new detection rises above this predation activity power level threshold that is a threshold level above the baseline activity power threshold established for detecting activities of a hatching turtle. If an activity power level rises above this threshold, the confidence level for a predation activity has increased, rendering the presence of activities of a hatching turtle inconclusive. Predation activities can occur simultaneously with hatching activities or predation activities can occur without hatching activities.

As used herein and referring to FIGS. 3-9, an anomaly is an occurrence which corresponds to an activity power over line 32. If necessary, activity duration may be calculated and used for determining whether a hatching event has started. Referring back to FIGS. 1-2, upon detecting a hatching activity, a signal is immediately sent from the controller 24 to the mobile device 28, alerting a stakeholder of the turtle nest of a hatching event. Personnel may then be sent to the nest to assist and protect the hatchlings. It is also possible that the detector 2 has been inadvertently removed by natural forces, e.g., rising tides and strong winds, etc., or by deliberate actions, e.g., tampering or theft of the detector 2 by poachers. In one embodiment, a localization system, e.g., a GPS system 46 is coupled to the detector 2 to reflect the location of the detector 2. If the GPS system reports a large change in location, e.g., a change of about 2 m or more, activity power levels of the detector 2 should be examined for periods before and after the detection of the location change indicated by the GPS system. If the detector 2 also reports activity levels that vary from a pre-activity quiesce condition by at least 10 dB, e.g., from about 5 minutes before the change indicated by the GPS system to about 5 minutes after the change indicated by the GPS system.

Figure 7:
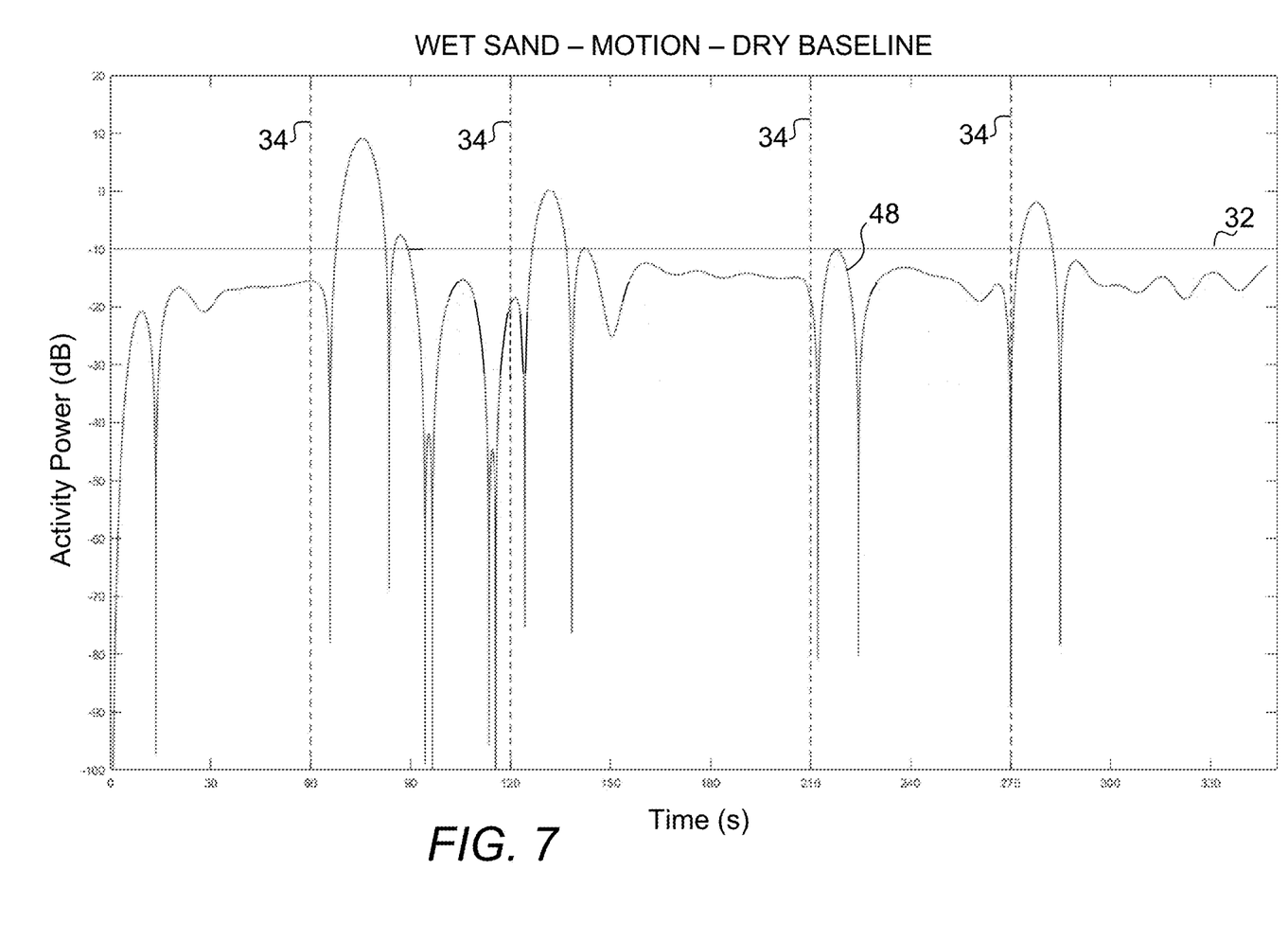
FIG. 7 is another diagram depicting exemplary radar power levels collected from a turtle nest with hatching activities in a wet sand environment as compared to a baseline power level established based on a dry sand environment.

FIG. 7 is another diagram depicting exemplary radar power levels collected from a turtle nest with hatching activities in a wet sand environment as compared to a baseline power level established based on a dry sand environment. Contrasting FIG. 7 to FIG. 3, it shall be noted that the baseline, i.e., line 32, established in a dry environment as shown in FIG. 3 is still a generally acceptable baseline established in the same wet environment as shown in FIG. 6. Three of the four activities each caused an activity level that exceeds the baseline, i.e., line 32. Only event 48 did not exceed this baseline. However, a spike in the activity power level is observed to have occurred between the second line 34 and fourth line 34 on FIG. 34 along the time axis, indicating that although the spike coinciding with the third line 34 does not rise to a level over line 32. Contrasting FIG. 7 to FIG. 4, it shall be noted that the baseline, i.e., line 32, established in a dry environment as shown in FIG. 3 and used to detect activities in FIG. 4, is still also a generally acceptable baseline established in the dry environment as shown in FIG. 3.

Figure 8:
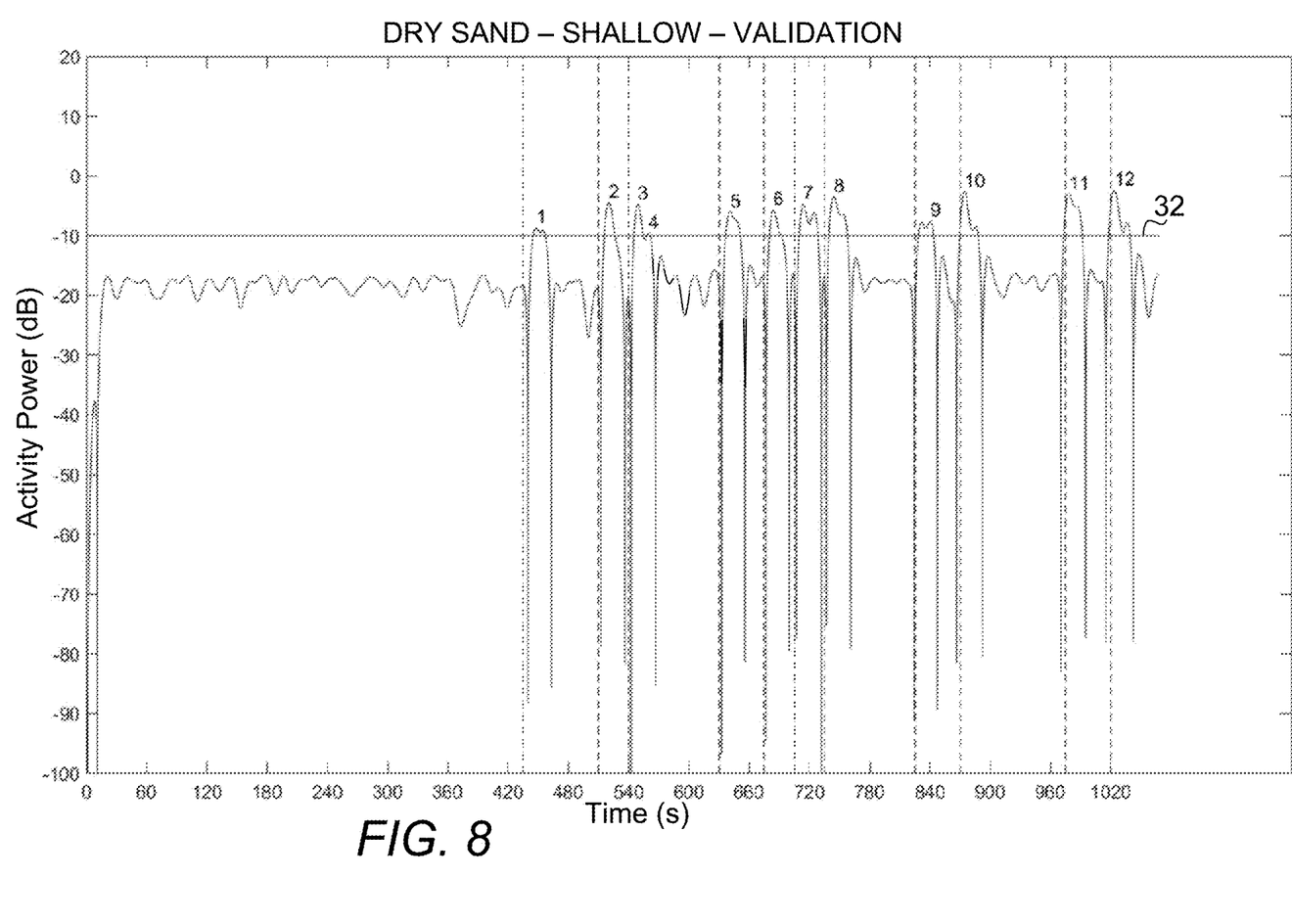
FIG. 8 is a diagram depicting exemplary radar power levels collected from a turtle nest with hatching activities in a dry sand environment where the hatching activities occur in a shallow subsurface.
Figure 9:
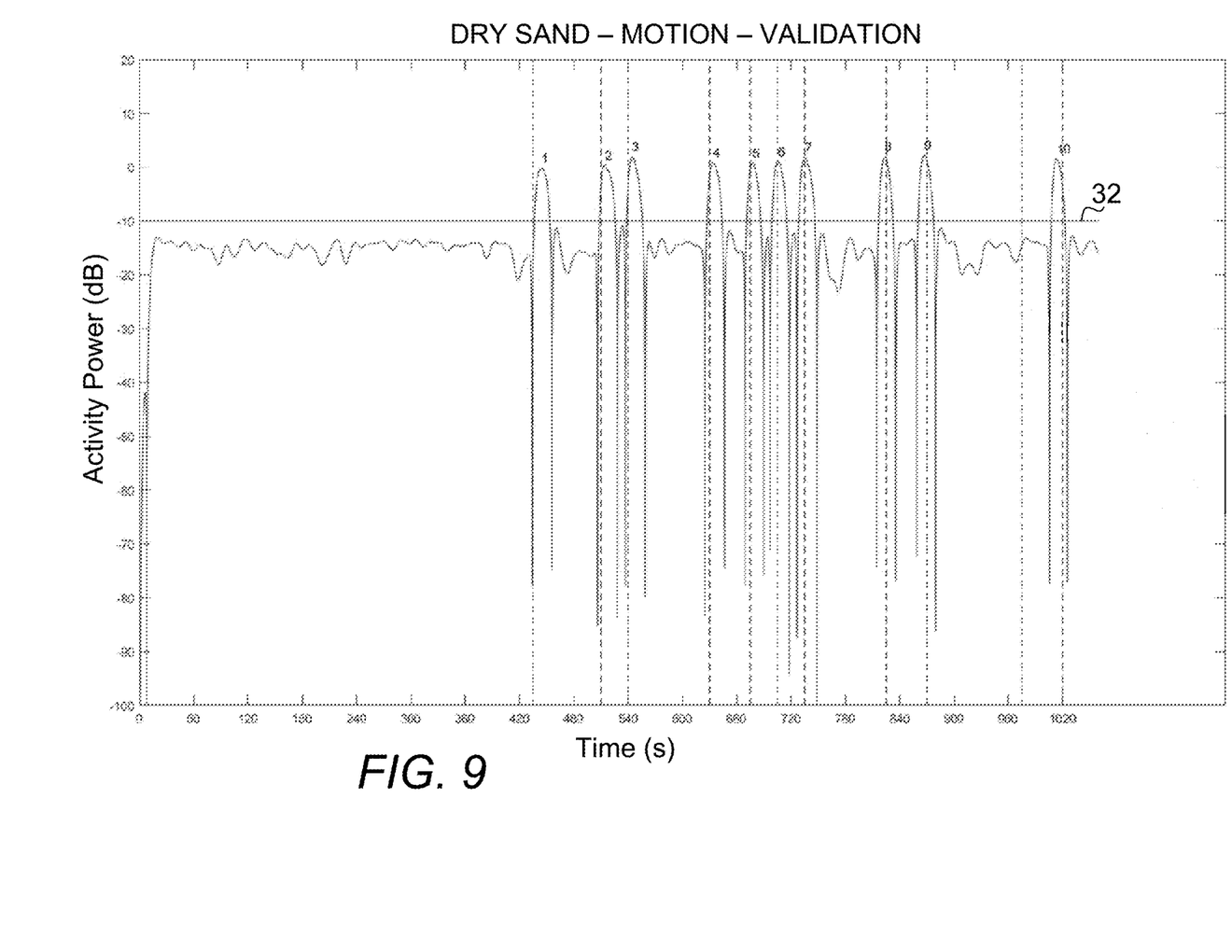
FIG. 9 is a diagram depicting exemplary radar power levels collected from a turtle nest with hatching activities in a dry sand environment of FIG. 8.

FIG. 8 is a diagram depicting exemplary radar power levels collected from a turtle nest with hatching activities in a dry sand environment where the hatching activities occur in a shallow subsurface of about 23 cm deep. FIG. 9 is a diagram depicting exemplary radar power levels collected from a turtle nest with hatching activities in a dry sand environment of FIG. 8. FIGS. 8 and 9 serve as a confirmation that once a baseline activity power level has been properly established, it can be reliably used to detect subsequent subsurface activities. It shall also be noted that the dry sand baseline is robust enough to be used also in wet conditions. This removes the requirement to learn and accommodate for the various sand conditions that may occur. Experimental training sets were used to train models of the baseline static and dynamic noise for both wet and dry sand. These baselines are then subtracted from the raw signal to improve the signal/noise ratio. Using the dry sand baseline for activity detection in wet sand demonstrated accurate activity detection relative to using the wet sand baseline. Unsupervised machine learning methods may be deployed to create models to represent subsurface static and dynamic noise.

Temperature is important to hatchling survival. Survival drops off if the temperature is too low or too high. Global warming may raise the temperature too high, affecting survival rates. Therefore, a temperature sensor may be provided to take air temperatures while the present detector is set up for detecting hatching eggs. The temperature sensor may be coupled to the detector or it may be provided as a separate unit. The air temperature is an indication of the nest temperature as the nest temperature may be inferred from the air temperature. If the typical incubation period has significantly passed and the temperatures have been determined to be unsuitable for successful incubation of the turtle eggs, the turtle nest may be safely abandoned. Temperature data or other additional data indicating conditions of the turtle nest and its surroundings, e.g., time of day, subsurface moisture level, brightness of the area surrounding the nest, etc., can all be logged locally or by transmitting the data in real time or near real time from the controller 24 to appropriate servers via the internet 42. Therefore, in addition to the ability to detect subsurface activities, the present controller to which the detector is functionally connected can also be used to establish correlations of environmental parameters to hatchings which are not currently known.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for detecting an activity in a turtle nest using a radar system, said method comprising:
    (a) establishing a baseline radar power level of the turtle nest in the medium by transmitting an outgoing radar signal towards the turtle nest and collecting an incoming radar signal responsive to said outgoing radar signal, said incoming radar signal comprising radar power levels of the medium during a quiesce condition using the radar system; and
    (b) detecting one or more radar data anomalies in radar data received of the medium with respect to said baseline radar power level, wherein a presence of said one or more anomalies indicates a presence of the activity of the turtle nest, wherein said one or more anomalies is determined by comparing said radar data received of the medium and said baseline radar power level and if said radar data received of the medium exceeds a threshold value that is at least about 3 standard deviations of the mean power levels for said baseline radar power level and an activity power over about −10 decibel (dB), the activity in the turtle nest is said to have occurred.

2. The method of claim 1, wherein said establishing step comprises establishing said baseline radar power level by using a machine learning training technique.

3. The method of claim 1, wherein the radar system comprises an ultra-wideband impulse radar (UWB-IR) system.

4. The method of claim 1, wherein said establishing step comprises disposing the radar system above the medium without disturbing the medium.

5. The method of claim 1, wherein the medium is a medium selected from the group consisting of sand, dry sand and wet sand.

6. The method of claim 1, further comprising comparing a level of said one or more radar data anomalies to an activity power threshold level for a second object, wherein if said level of said one or more radar data anomalies is the same or larger than said activity power threshold level for the second object and said activity power threshold level for the second object is higher than an activity power threshold level of the turtle nest, the activity in the turtle nest is deemed inconclusive.

* * * * *